United States Patent
Yeon et al.

(10) Patent No.: US 9,634,329 B2
(45) Date of Patent: Apr. 25, 2017

(54) METHOD OF PREPARING GRAPHENE AND ANODE MIXTURE FOR LITHIUM SECONDARY BATTERY INCLUDING GRAPHENE PREPARED THEREBY

(71) Applicant: Korea Institute of Energy Research, Daejeon (KR)

(72) Inventors: Sun-Hwa Yeon, Sejong-Si (KR); Kyoung-Hee Shin, Daejeon (KR); Chang-Soo Jin, Daejeon (KR); Kyu-Nam Jung, Daejeon (KR); Jae-Deok Jeon, Daejeon (KR); Joonmok Shim, Daejeon (KR); Jung-Hoon Yang, Daejeon (KR); Bum-Suk Lee, Daejeon (KR); Myung Seok Jeon, Daejeon (KR); Wook Ahn, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 196 days.

(21) Appl. No.: 14/539,269

(22) Filed: Nov. 12, 2014

(65) Prior Publication Data

US 2015/0132654 A1    May 14, 2015

(30) Foreign Application Priority Data

Nov. 14, 2013 (KR) ........................ 10-2013-0138012

(51) Int. Cl.
*C01B 31/04* (2006.01)
*H01M 4/587* (2010.01)
*H01M 4/62* (2006.01)
*H01M 10/0525* (2010.01)

(52) U.S. Cl.
CPC ......... *H01M 4/587* (2013.01); *C01B 31/0446* (2013.01); *H01M 4/623* (2013.01); *C01P 2006/40* (2013.01)

(58) Field of Classification Search
CPC .......................... H01M 4/587; C01B 31/0446
See application file for complete search history.

(56) References Cited

FOREIGN PATENT DOCUMENTS

KR    1020110056115 A    5/2011

OTHER PUBLICATIONS

Peng, Tao, Zongkui Kou, Hui Wu, and Shichun Mu. "Graphene from Amorphous Titanium Carbide by Chlorination under 200° C. and Atmospheric Pressures." Sci. Rep. Scientific Reports 4 (2014): 1-5.*

(Continued)

*Primary Examiner* — Barbara Gilliam
*Assistant Examiner* — Stephan Essex
(74) *Attorney, Agent, or Firm* — Westman, Champlin & Koehler, P.A.; Amanda M. Prose

(57) ABSTRACT

Disclosed herein is a method of preparing porous graphene from porous graphite, including 1) thermochemically reacting a highly crystalline carbide compound with a halogen element-containing gas to give a porous carbide-derived carbon; 2) treating the carbide-derived carbon with an acid, thus preparing a carbide-derived carbon oxide; and 3) reducing the carbide-derived carbon oxide. An anode mixture for a secondary battery including the graphene and an anode for a secondary battery including the anode mixture are also provided.

12 Claims, 10 Drawing Sheets

(56) References Cited

OTHER PUBLICATIONS

Office Action for related application No. KR 10-2013-0138012, dated Nov. 18, 2014.
Notice of Allowance for related application No. KR 10-2013-0138012, dated Jan. 16, 2015.
Fang et al. (2013) "Two-Dimensional Mesoporous Carbon Nanosheets and Their Derived Graphene Nanosheets: Synthesis and Efficient Lithium Ion Storage" J Am Chem 2013, vol. 135, pp. 1524-1530.
Fan et al. (2011) "Easy syntehsis of porous graphene nanosheets and their use in supercapacitors" Carbon vol. 50 pp. 1699-1712.

* cited by examiner

METHOD OF PREPARING GRAPHENE AND ANODE MIXTURE FOR LITHIUM SECONDARY BATTERY INCLUDING GRAPHENE PREPARED THEREBY

BACKGROUND OF THE INVENTION

1. Field of the Invention

The present invention relates to a method of preparing graphene and an anode mixture for a lithium secondary battery including graphene prepared thereby, and more particularly, to a method of preparing graphene by thermochemically reacting a crystalline carbide compound serving as a starting material with a halogen element-containing gas to give a porous carbide-derived carbon which is then oxidized and reduced, and to an anode mixture for a lithium secondary battery including graphene prepared thereby.

2. Description of the Related Art

Lithium ion secondary batteries for use in mobile phones, PDAs, digital cameras, camcorders, etc. are manufactured in such a manner that an oxide and a graphite, which are respectively utilized as a cathode material and an anode material for a chemical battery system, are mixed with an appropriate binder and conductor to give a slurry, followed by forming a cathode plate and an anode plate, which are then wound or stacked together with a separator to form a core cell, after which the core cell is encased, thus fabricating a lithium secondary battery having a cylindrical, prismatic and pouch shape.

Thorough research into performance improvements of lithium secondary batteries is ongoing, especially in the area of capacity and energy density. To this end, methods of enhancing performance of batteries through improvements of designs and development and improvement of materials are under study, but are dependent on development of electrode active materials, especially anode active materials.

Initially used as an anode active material for an anode of a lithium secondary battery is lithium metal. However, lithium has drawbacks of low reversibility and poor stability, and research into anode active materials for lithium secondary batteries is still ongoing.

Accordingly, a material for an electron emitting source may include a carbonaceous material, for example, carbon nanotubes having superior conductivity and field concentration and emission properties with low work function. However, carbon nanotubes are typically provided in the form of fibers having a high field enhancement factor, and materials having such a shape are problematic in terms of uniformity and lifetime. The fibers made of a paste, ink or slurry have inferior process problems compared to other materials in particle form, and furthermore, raw materials thereof are very expensive.

To solve the problems with carbon nanotubes, extensive and intensive research into use of graphene as an anode active material has been carried out. In particular, graphene is prepared using a Hummers method for oxidizing and reducing graphite. Graphite typically used in a Hummers method is highly crystalline non-porous carbon, and graphene prepared by highly crystalline non-porous carbon is composed mainly of macropores.

Recently, however, since electrode materials for secondary batteries, including electrodes for lithium secondary batteries, supercapacitors or flow capacitors, and movable electrodes, require graphene having micropores or mesopores, graphene having macropores prepared from highly crystalline non-porous carbon is difficult to use in electrodes for secondary batteries.

SUMMARY OF THE INVENTION

Accordingly, the present invention has been made keeping in mind the problems encountered in the related art, and an object of the present invention is to provide a method of preparing graphene having micropores or mesopores by thermochemically reacting a crystalline carbide compound serving as a starting material with a halogen element-containing gas to give a porous carbide-derived carbon (porous CDC), oxidizing the porous CDC to form a CDC oxide, and reducing the CDC oxide.

Another object of the present invention is to provide an anode mixture for a secondary battery, including graphene having micropores or mesopores prepared from the porous CDC, and an anode for a secondary battery, including the anode mixture.

In order to accomplish the above objects, the present invention provides a method of preparing graphene, comprising: thermochemically reacting a crystalline carbide compound with a halogen element-containing gas to give a porous carbide-derived carbon (Step 1); treating the carbide-derived carbon with an acid, thus preparing a carbide-derived carbon oxide (Step 2); and reducing the carbide-derived carbon oxide (Step 3).

The crystalline carbide compound in Step 1 may be crystalline metal carbide as a compound of carbon and any element selected from the group consisting of Groups 3, 4, 5 and 6 elements in periodic table and combinations thereof.

The crystalline carbide compound in Step 1 may be selected from the group consisting of SiC, $B_xC_y$, TiC, $ZrC_x$, $Al_xC_y$, $Ca_xC_y$, $Ti_xTa_yC$, $Mo_xWyC$, $TiN_xC_y$, $ZrN_xC_y$, $SiC_4$, TiAlC and $Mo_2C$, in which x and y may be determined stoichiometrically, but the present invention is not limited thereto, and any carbide compound may be appropriately selected by those skilled in the art so long as it is usable for preparation of carbide-derived carbon.

The halogen element-containing gas in Step 1 may include, but is not limited to, $Cl_2$, $TiCl_4$ or $F_2$, so long as it is halogen element-containing gas. The thermochemical reaction in Step 1 is performed at 200 to 1200° C., preferably 800 to 1200° C. and more preferably 1200° C. Also, the thermochemical reaction with the halogen element-containing gas may be carried out for 3 to 5 hr.

The carbide-derived carbon prepared in Step 1 may include porous graphite having pores and highly crystalline graphite fringe, unlike conventionally useful highly crystalline non-porous graphite.

The process of preparing carbide-derived carbon via thermochemical reaction between the crystalline carbide compound in Step 1 and the halogen element-containing gas is represented by Scheme 1 below.

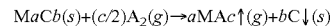

$$MaCb(s)+(c/2)A_2(g) \rightarrow aMAc\uparrow(g)+bC\downarrow(s) \qquad \text{[Scheme 1]}$$

In Scheme 1, M indicates a metal, C indicates carbon, and A indicates a halogen element.

When the crystalline carbide compound is thermochemically reacted with the halogen element-containing gas, elements other than carbon in the crystalline carbide compound are removed and thus porous carbide-derived carbon may be obtained. In the present invention, graphene may be prepared using porous carbide-derived carbon instead of conventional non-porous graphite.

After the thermochemical reaction in Step 1, annealing using any one gas selected from the group consisting of $H_2$, Ar, $N_2$ and $NH_3$ may be further performed. This annealing is conducted for 1 to 3 hr. When annealing is performed in this way, halogen gas or metal products remaining on the surface of carbon after thermochemical reaction may be removed, thus obtaining high-purity carbide-derived carbon.

The acid treatment in Step 2 may be performed by a Hummers method for oxidizing the carbide-derived carbon with an acid solution and an oxidant, but is not limited thereto and may be carried out by an acid treatment method useful in preparation of graphene, including a Staudenmaier method or a Brodie method.

The acid solution may include one or more selected from the group consisting of sulfuric acid ($H_2SO_4$), hydrochloric acid (HCl), nitric acid ($HNO_3$) and phosphoric acid ($H_3PO_4$). Preferably useful are sulfuric acid and phosphoric acid. Any acid solution may be appropriately selected by those skilled in the art, so long as it is useful in acid treatment in the graphene preparation field to which the present invention belongs.

The oxidant may be hydrogen peroxide ($H_2O_2$) or potassium permanganate ($KMnO_4$), but is not limited thereto, and any oxidant may be appropriately selected by those skilled in the art so long as it is useful in acid treatment in the graphene preparation field to which the present invention belongs.

In Step 3, the carbide-derived carbon oxide may be mixed with the thermal conductor, irradiated with microwaves and reduced. When microwaves are applied to the blend of the carbide-derived carbon oxide and the thermal conductor, the volume of carbide-derived carbon oxide may expand, yielding porous graphene having micropores or mesopores corresponding to the reduced graphite oxide resulting from repeated thermal treatment.

The thermal conductor may be carbon black, such as acetylene black, ketjen black, channel black, furnace black, lamp black, summer black, super-p, toca black or denka black. Preferably useful is super-p.

The porous graphene prepared in Steps 1 to 3 may be utilized in an anode for a secondary battery, an electrode material for a lithium air battery, an electrode for a supercapacitor, an electrode for a flow capacitor, a carrier for a fuel cell catalyst or a hydrogen storage medium.

In addition, the present invention provides an anode mixture for a secondary battery, including graphene prepared by the method including Steps 1 to 3 as above, a conductor and a binder, and also provides an anode for a secondary battery, formed by applying the anode mixture on a collector.

The graphene, the conductor and the binder may be mixed at a ratio of 8:1:1, and the binder may include one or more selected from the group consisting of polyvinylidene fluoride, polyvinylidene fluoride-co-hexafluoropropylene, polyacrylonitrile, and polymethylmethacrylate.

The anode formed by applying the anode mixture on the collector may be used in a secondary battery, and the secondary battery may be a lithium secondary battery.

According to the present invention, porous graphene having micropores or mesopores can be prepared by thermochemically reacting a crystalline carbide compound with a halogen element-containing gas to give a porous carbide-derived carbon having porous graphite, which is then oxidized and reduced, thus remarkably increasing ion mobility, and thereby such graphene can be adapted for use in electrodes for secondary batteries, including electrodes for lithium ion secondary batteries, supercapacitors or flow capacitors, and movable electrodes.

In addition, an anode for a secondary battery including porous graphene prepared by the present invention, especially an anode material for a lithium secondary battery can have a capacity much greater than a theoretical capacity of a carbon anode material.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1A:
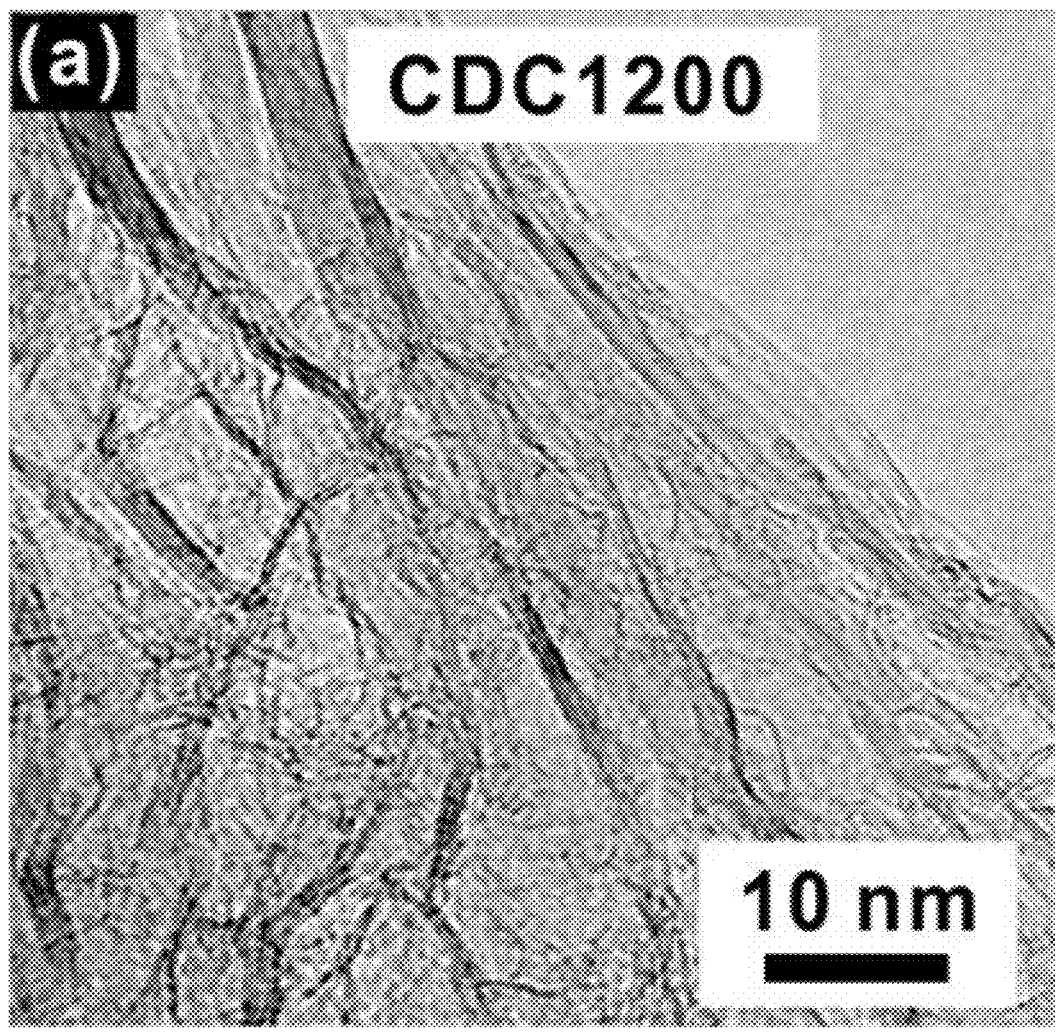
FIG. 1A is a transmission electron microscope (TEM) image illustrating CDC1200 according to an embodiment of the present invention.

Hereinafter, a detailed description will be given of the present invention with reference to the appended drawings. The present invention is not limited to the following embodiments, and may be modified into other forms. Such embodiments disclosed herein are provided so that the spirit of the present invention is sufficiently conveyed to those skilled in the art, and are not be construed as limiting the present invention.

EXAMPLE 1

Preparation of Graphene from Porous CDC (Carbide-Derived Carbon)

TiC was thermochemically reacted with $Cl_2$, thus preparing CDC1200 (Step 1).

In Step 1, TiC as a crystalline carbide compound and $Cl_2$ as a halogen element-containing gas were thermochemically reacted at 1200° C. for about 3 hr, thus obtaining CDC. As such, in order to obtain high-purity CDC by removing $Cl_2$ or titanium chloride ($TiCl_4$) remaining on the surface of CDC, annealing the CDC with $H_2$ gas for about 2 hr was performed, yielding porous CDC1200.

A process of preparing CDC1200 via thermochemical reaction of TiC and $Cl_2$ is represented by Scheme 2 below.

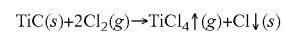  [Scheme 2]

Subsequently, CDC1200 was oxidized by a Hummers method, thus obtaining CDC oxide (Step 2).

In Step 2, CDC1200, 360 mL of $H_2SO_4$, and 40 mL of $H_3PO_4$ were placed in a single-neck round bottom flask and mixed for about 30 min, thus preparing a first mixed solution (in an amount of about 3 g), after which the flask containing the first mixed solution was placed in an ice-bath and sufficiently cooled. When the temperature of the first mixed solution was lowered to 20° C. or less, potassium permanganate ($KMnO_4$, about 18 g) was slowly added to the first mixed solution, thus preparing a second mixed solution, after which the flask containing the second mixed solution was placed in a heating mantle and sufficiently stirred for 6 hr or longer while the temperature was maintained at 45~55° C.

Further, the flask containing the second mixed solution was placed in an ice-bath. When the temperature of the mixed solution was lowered to 20° C. or less, $H_2O$ (about 400 mL) was slowly added to the second mixed solution, and then $H_2O_2$ (about 15 to 20 mL) was added to the second mixed solution, thus preparing a third mixed solution, which was then stirred at room temperature for 8 hr or longer.

$H_2O$, HCl and EtOH (each 200 mL) were mixed with stirring for about 2 hr, blended with the third mixed solution, stirred, and washed until pH was 5 or less in a centrifuge. The resulting sample was dried in a freezing dryer, thus obtaining CDC oxide.

Subsequently, the CDC oxide was reduced by a Hummers method, yielding graphene RGO_CDC1200 (Step 3).

In Step 3, the CDC oxide was sufficiently mixed with a thermal conductor super-p at a mixing ratio of 9:1, thus obtaining a powder, which was then placed in a glass bottle having a sufficient size. The glass bottle was filled with Ar, followed by reduction with microwaves, yielding RGO_CDC1200. When the glass bottle containing Ar was irradiated with microwaves, the volume of the CDC oxide powder expanded, so that porous graphene RGO_CDC1200 having micropores or mesopores could be obtained via repeated thermal treatment effects by repetitive irradiation of microwaves.

EXAMPLE 2

Preparation of Anode Mixture for Lithium Secondary Battery Including RGO_CDC1200

An anode mixture for a lithium secondary battery was prepared by mixing RGO_CDC1200 of Example 1, a super-P conductor and a polyvinylidene fluoride binder at a weight ratio of 8:1:1 at a high rate of about 2,000 rpm for 30 min using a homogenizer.

EXAMPLE 3

Manufacture of Anode for Lithium Secondary Battery Including RGO_CDC1200

An anode for a lithium secondary battery was manufactured in such a manner that the anode mixture of Example 2 was cast on a copper plate having a thickness of 10 µm using a doctor blade and dried at 80° C., and a polar plate having a size of 3×4 cm was formed from the copper plate, rolled and dried in a vacuum oven at 80° C. for 24 hr.

EXAMPLE 4

Manufacture of Lithium Secondary Battery Including RGO_CDC1200

The anode of Example 3 was assembled with a lithium metal electrode having the same size in a groove box using a coin cell. As such, the electrolyte was obtained by adding 1 M $LiPF_6$ to a mixed solvent of ethylene carbonate (EC) and diethylcarbonate (DEC) at a weight ratio of 1:1, and the separator was Celgard 2400 (available from Hoechest Celanese Corp.).

COMPARATIVE EXAMPLE 1

Preparation of Graphene from Highly Crystalline Non-Porous Graphite

A highly crystalline non-porous graphite was oxidized in the same manner as in Example 1, with the exception of Step 1 of Example 1, thereby preparing graphite oxide (GO), which was then reduced, yielding RGO_Graphite.

TEST EXAMPLE 1

TEM Image Analysis of CDC1200, GO and RGO_CDC1200

Figure 1B:
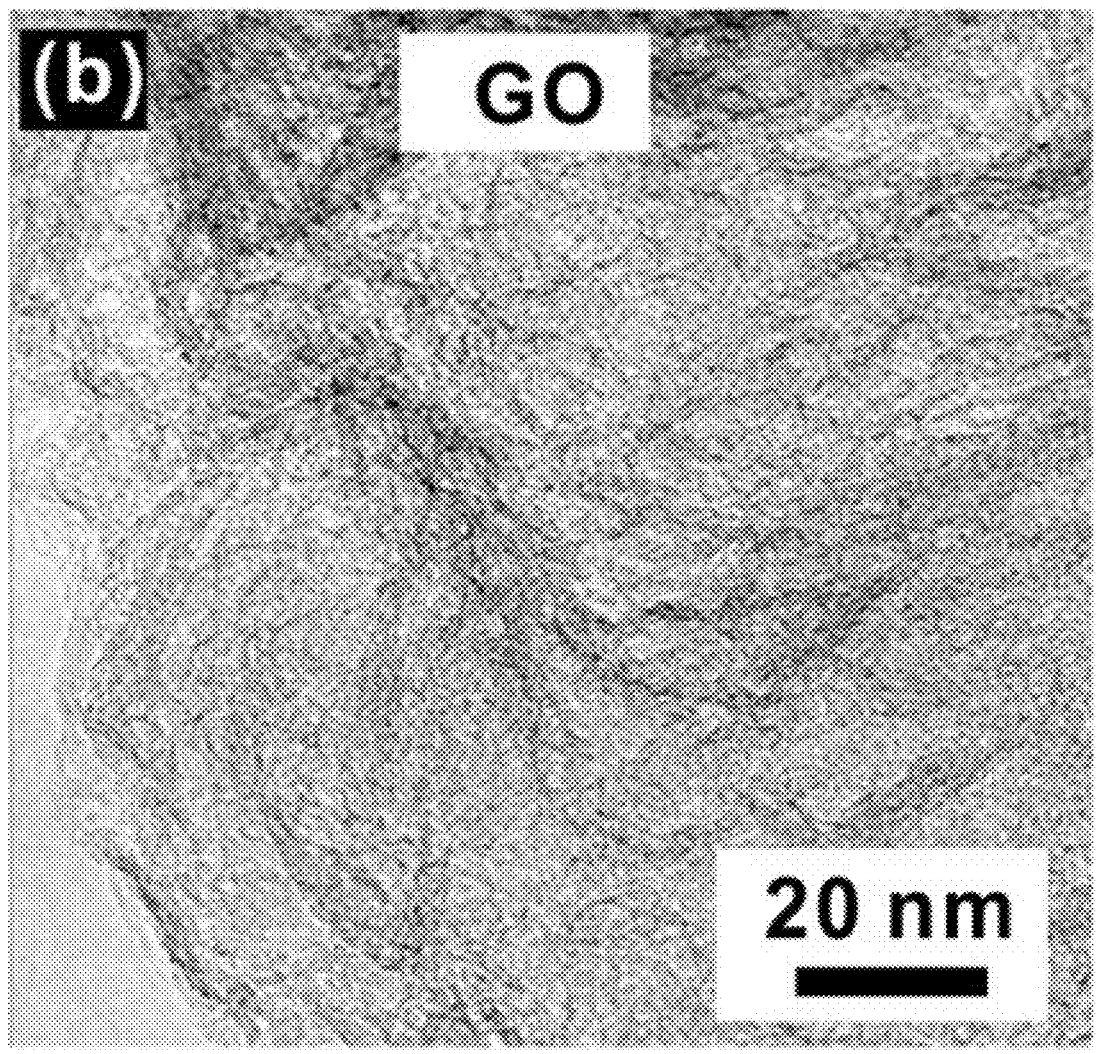
FIG. 1B is a TEM image illustrating graphite oxide (GO) obtained by oxidizing conventional graphite and FIG. 1C is a TEM image illustrating RGO (Reduced Graphite Oxide)_CDC1200 obtained by oxidizing and reducing CDC1200 according to an embodiment of the present invention.
Figure 1C:
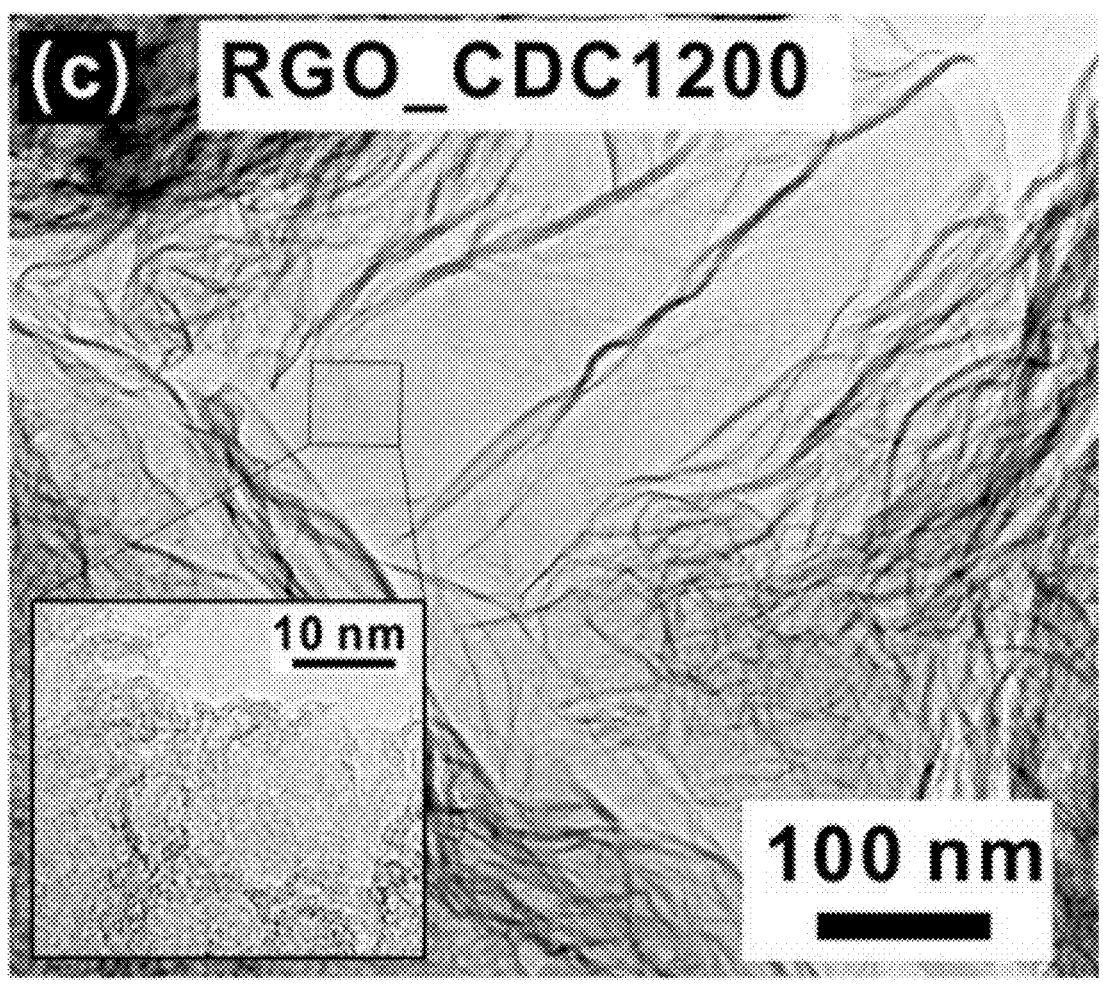

TEM images of CDC1200 prepared in Step 1 of Example 1, GO of Comparative Example 1, and RGO_CDC1200 prepared in Steps 1 to 3 of Example 1 are illustrated in FIGS. 1A to 1C.

As illustrated in FIGS. 1A to 1C, when compared with GO of FIG. 1B, CDC1200 of FIG. 1A had a porous structure with a highly crystalline graphite fringe. RGO_CDC1200 of FIG. 1C had graphene sheets with the graphene flake or crumbled graphene having micropores/mesopores, but was different from RGO_Graphite in which the graphene flake or crumbled graphene was present but only a typical flake having almost no micropores/mesopores was produced.

TEST EXAMPLE 2

Figure 2A:
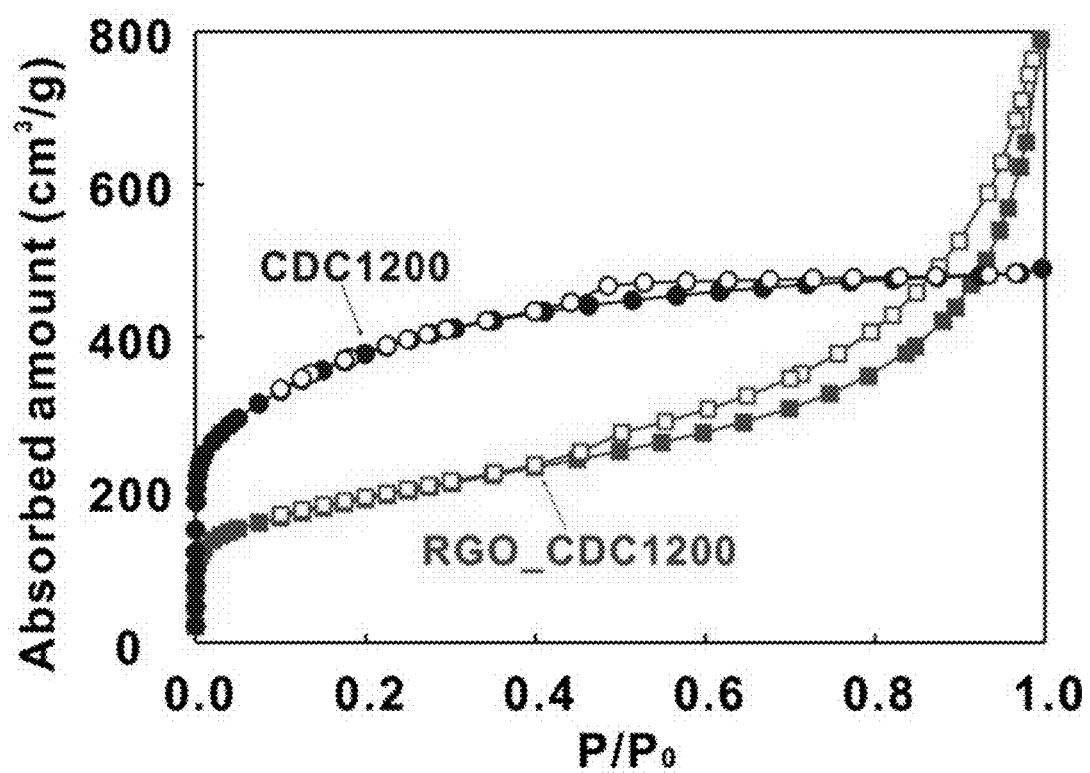
FIGS. 2A and 2B are graphs illustrating an $N_2$ adsorption curve and a pore distribution, respectively, of CDC1200 and RGO_CDC1200 according to an embodiment of the present invention.
Figure 2B:
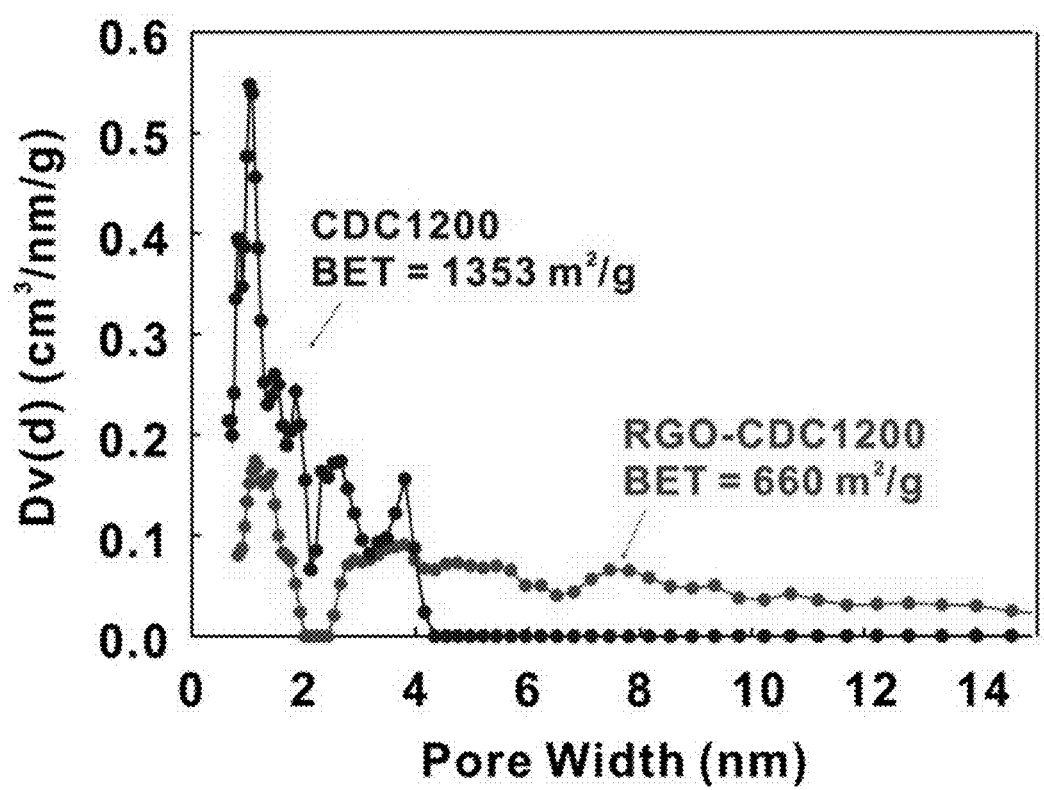
Figure 3A:
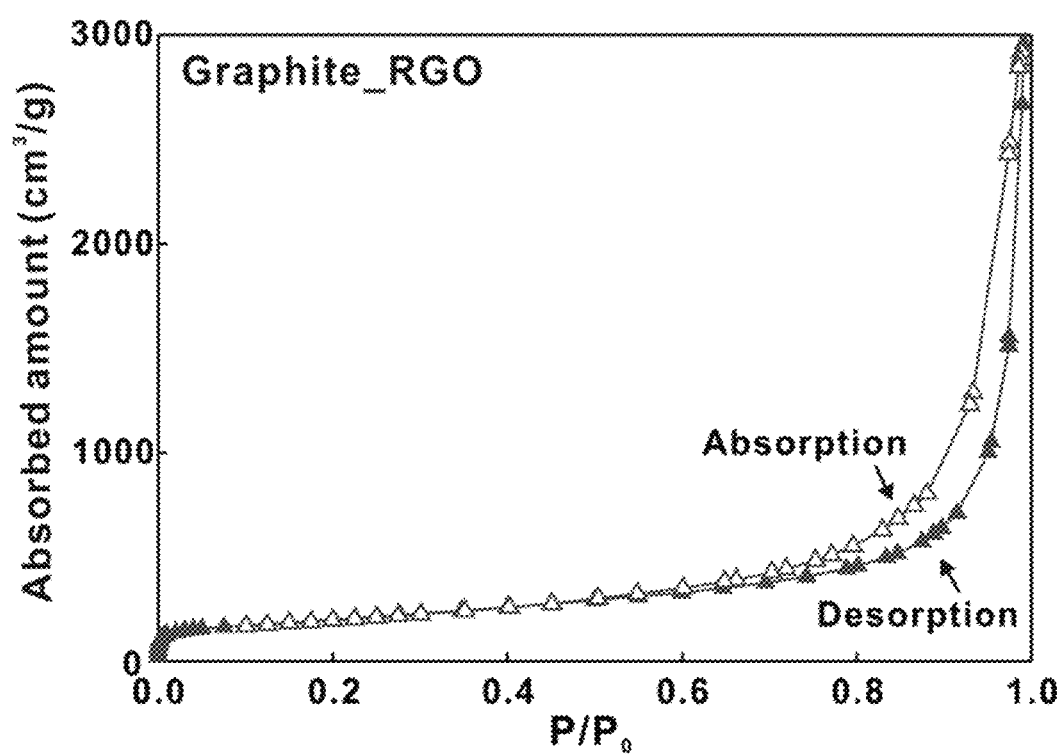
FIGS. 3A and 3B are graphs illustrating an $N_2$ adsorption curve and a pore distribution, respectively, of RGO_Graphite obtained by oxidizing and reducing conventional graphite.
Figure 3B:
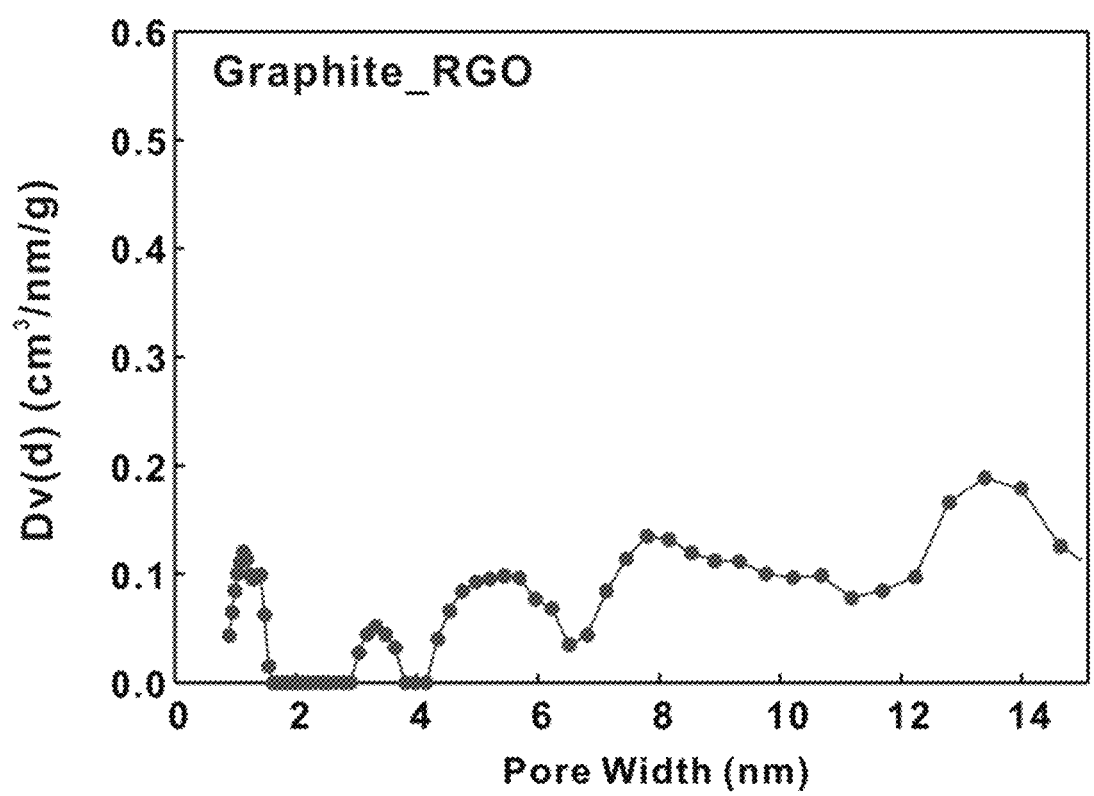
Figure 4A:
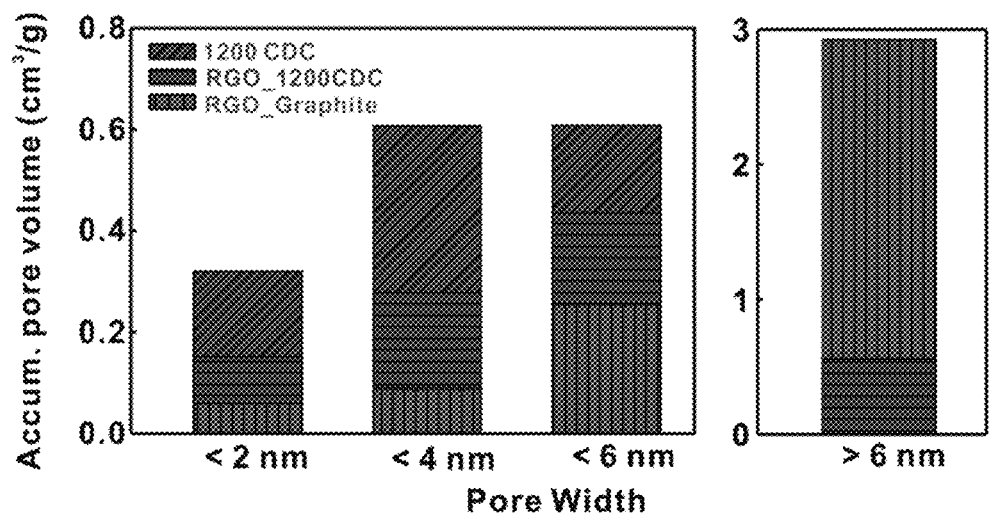
FIGS. 4A and 4B are graphs illustrating a pore distribution and a specific surface area, respectively, of CDC1200 and RGO_CDC1200 according to an embodiment of the present invention, and conventional RGO_Graphite.
Figure 4B:
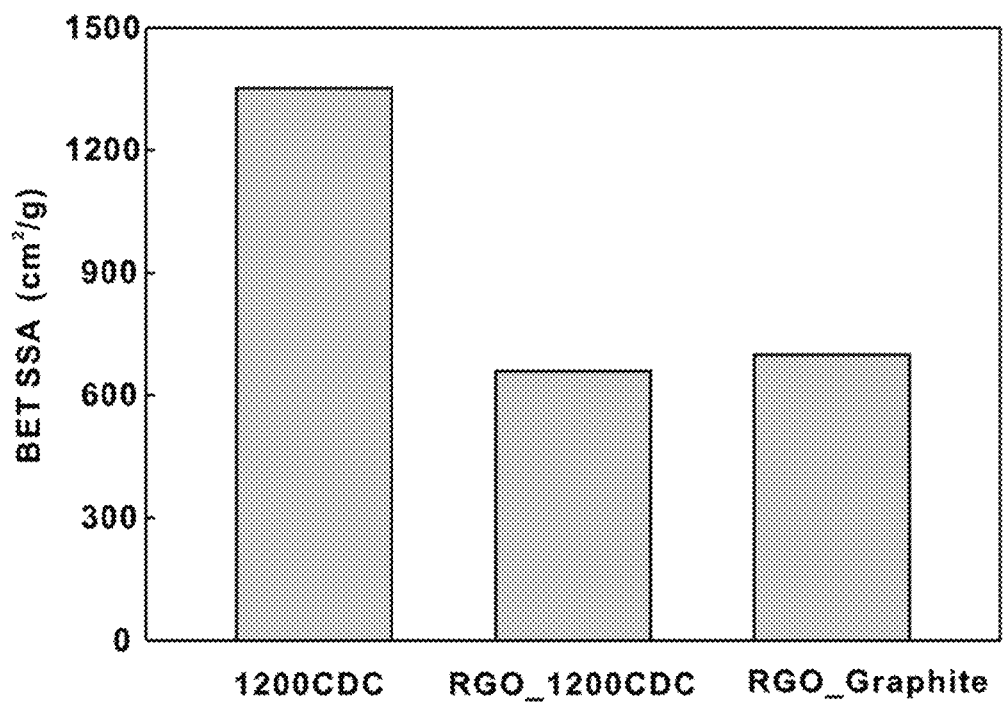

Analysis of $N_2$ Adsorption Curve and Pore Distribution of RGO_CDC1200 and RGO_Graphite As illustrated in FIGS. 2A and 2B, $N_2$ adsorption curves of CDC1200 and RGO_CDC1200 were typical adsorption and desorption hysteresis curves. Mesopores having a pore size of 2 to 50 nm were present, and CDC1200 having high adsorption in the initial relative pressure was composed mainly of micropores having a pore size of less than 2 nm, and RGO_CDC1200 having high adsorption in the late relative pressure was composed mainly of mesopores including micropores.

Also, CDC1200 and RGO_CDC1200 had a pore distribution composed mostly of micropores with a pore size of 0.5 to 2 nm or mesopores with a pore size of 2 to 10 nm, but RGO_Graphite had a pore distribution with a pore size of 6 nm or more.

Unlike charge-discharge between layers of graphite, charge-discharge of lithium ions in graphene may be performed in pores having various shapes produced upon separation of interlayer sheets. Therefore, the charge-discharge efficiency may be dominated by the pore shape adapted for the size of lithium ions. Controlling the size of micropores/mesopores is an important factor for determining the charge-discharge efficiency of lithium ions.

Meanwhile, RGO_Graphite had a pore distribution in which macropores having a pore size of 20 nm or more constitute 90% or more thereof (FIGS. 3A, 3B, 4A and 4B). Such macropores have a problem of low charge-discharge efficiency of lithium ions because the reaction site to be charged with lithium ions is much greater than the ion size, and thus the number of ions to be charged into the reaction site cannot be increased.

Thus, RGO_CDC1200 according to the embodiment of the present invention can be suitable for use in an electrode for a secondary battery, including an electrode for a lithium secondary battery, an electrode for a supercapacitor, an electrode for a flow capacitor and a movable electrode, requiring graphene having micropores or mesopores.

TEST EXAMPLE 3

Measurement of Charge-Discharge Capacity of Anode for Lithium Secondary Battery Including RGO_CDC1200

The charge-discharge capacity of the anode for a lithium secondary battery including RGO_CDC1200 of Example 4 was measured using Maccor Series 4000. Specifically, discharge was carried out at a constant current in the potential range from an open circuit voltage to 0.001V vs. Li/Li+, and then charge-discharge was performed at 0.1 C-rate and 1 C-rate in the potential range of 2.8V to 0.005V vs. Li/Li+. As such, the theoretical capacity was based on 370 mAh/g that is the theoretical capacity of graphite.

Figure 5:
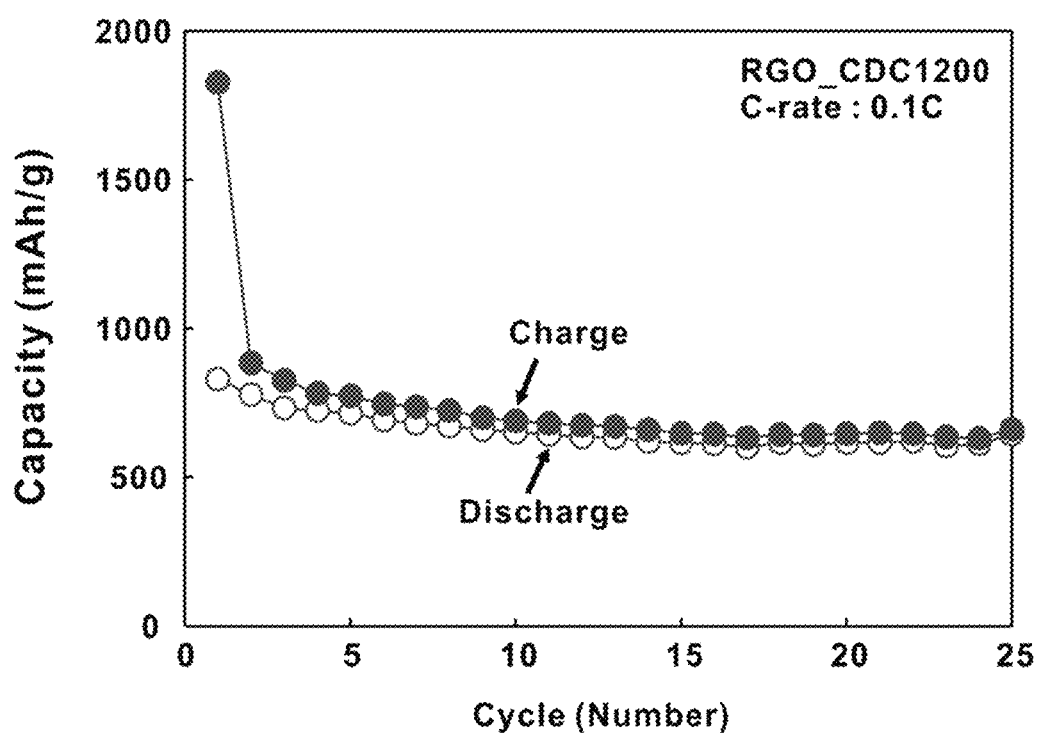
FIG. 5 is a graph illustrating a charge-discharge curve of an anode for a lithium secondary battery including RGO_CDC1200 prepared according to the embodiment of the present invention at a current density of 0.1 C.

As illustrated in FIG. 5, in the charge-discharge capacity of the anode for a lithium secondary battery including RGO_CDC1200 at a current density of 0.1 C, an irreversible capacity of about 1800 mAh/g was measured at the $1^{st}$ cycle and a high reversible capacity of about 900 mAh/g in the range from the $2^{nd}$ cycle to the $20^{th}$ cycle was measured.

Figure 6:
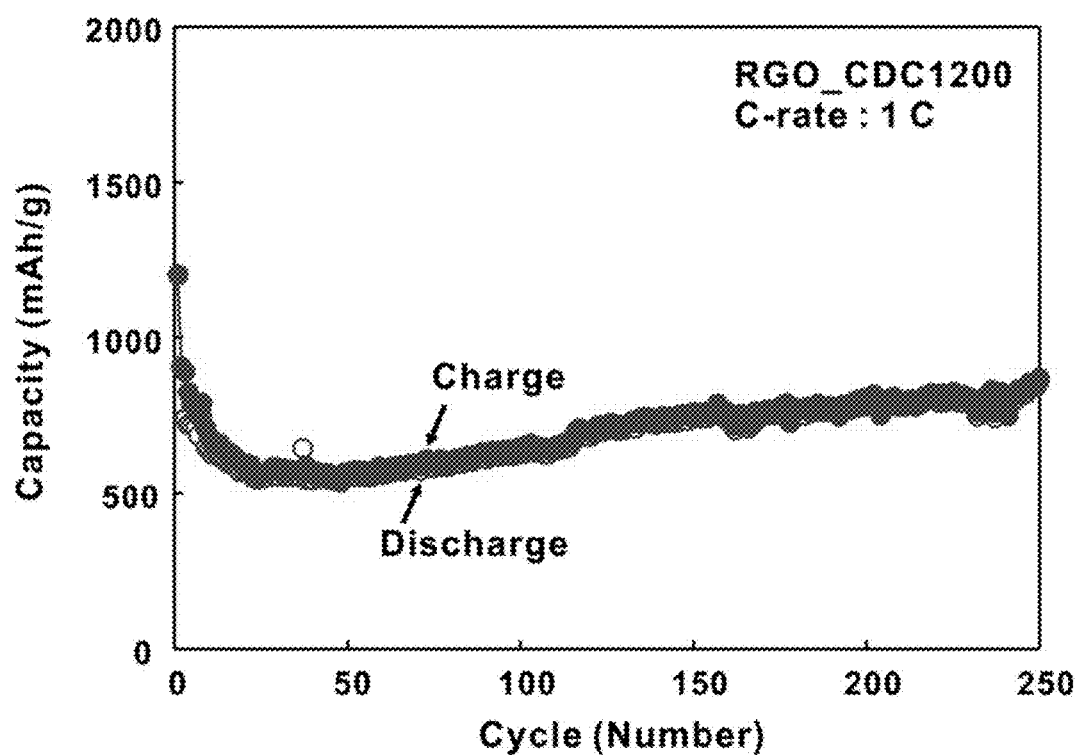
FIG. 6 is a graph illustrating a charge-discharge curve of an anode for a lithium secondary battery including RGO_CDC1200 prepared according to the embodiment of the present invention at a current density of 1 C.

As illustrated in FIG. 6, in the charge-discharge capacity of the anode for a lithium secondary battery including RGO_CDC1200 at a high current density of 1 C, an irreversible capacity of about 1300 mAh/g was initially measured and a high reversible capacity of about 900 mAh/g was measured at the $250^{th}$ cycle.

When using the inventive material, the charge-discharge capacity is about 2.5 times higher than 370 mAh/g that is the theoretical capacity of a carbon anode material. Hence, such an inventive material can be utilized as an electrode material for a secondary battery, especially an anode material for a secondary battery.

In particular, there are almost no changes in charge-discharge capacity not only at 0.1 C but also at a high current density of 1 C, which does not appear in conventional anode materials such as graphite or RGO_Graphite. Hence, the inventive material can be very useful as a high-power anode material.

For a conventional graphite anode material, lithium ions are charged and discharged between layers of graphite. During the charge-discharge cycles, the distance between the layers is increased and thus upon charge at high current density, volume expansion may occur and low charge-discharge capacity may be manifested. The electrode capacity may be decreased by half at 1 C compared to 0.1 C, and the electrode deformed due to volume expansion cannot return to its original structure, undesirably shortening the lifetime.

In the present invention, however, when charge-discharge is carried out in the pores of graphene, volume expansion may be excluded, and thus even when the number of cycles is higher, the efficiency is not decreased but is rather increased, thereby obtaining an anode material adapted for rapid charge and high voltage characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing graphene, comprising:
   1) thermochemically reacting a crystalline carbide compound with a halogen element-containing gas to give a porous carbide-derived carbon;
   2) treating the carbide-derived carbon with an acid, thus preparing a carbide-derived carbon oxide; and
   3) reducing the carbide-derived carbon oxide;
   wherein 3) is performed by irradiating a blend of the carbide-derived carbon oxide and a thermal conductor with microwaves so as to be reduced.

2. The method of claim 1, wherein the carbide compound in 1) is a compound of carbon and any element selected from the group consisting of Groups 3, 4, 5 and 6 elements in periodic table and combinations thereof.

3. The method of claim 2, wherein the carbide compound comprises at least one selected from the group consisting of SiC, $B_xC_y$, TiC, $ZrC_x$, $Al_xC_y$, $Ca_xC_y$, $Ti_xTa_yC$, $Mo_xW_yC$, $TiN_xC_y$, $ZrN_xC_y$, $SiC_4$, TiAlC and $Mo_2C$ (in which x and y are determined stoichiometrically).

4. The method of claim 1, wherein the halogen element-containing gas in 1) is selected from the group consisting of $Cl_2$, $TiCl_4$ and $F_2$.

5. The method of claim 1, wherein thermochemically reacting in 1) is performed at 200 to 1200° C.

6. The method of claim 1, wherein thermochemically reacting in 1) is performed for 3 to 5 hr.

7. The method of claim 1, further comprising performing annealing with any one gas selected from the group consisting of $H_2$, Ar, $N_2$ and $NH_3$, after thermochemically reacting in 1).

8. The method of claim 7, wherein the annealing is performed for 1 to 3 hr.

9. The method of claim 1, wherein treating the carbide-derived carbon with the acid in 2) is performed by oxidizing the carbide-derived carbon with an acid solution and an oxidant.

10. The method of claim 9, wherein the acid solution comprises one or more selected from the group consisting of sulfuric acid, hydrochloric acid, nitric acid and phosphoric acid.

11. The method of claim 9, wherein the oxidant is hydrogen peroxide or potassium permanganate.

12. The method of claim 1, wherein the thermal conductor is super-P.

* * * * *